US009692854B2

(12) United States Patent
Steinberg et al.

(10) Patent No.: US 9,692,854 B2
(45) Date of Patent: Jun. 27, 2017

(54) COMMUNICATION BETWEEN A WEB-BASED APPLICATION AND A DESKTOP APPLICATION

(71) Applicant: Facebook, Inc., Menlo Park, CA (US)

(72) Inventors: Arieh Steinberg, Menlo Park, CA (US); Jack O'Conner, Kirkland, WA (US)

(73) Assignee: Facebook, Inc., Menlo Park, CA (US)

( * ) Notice: Subject to any disclaimer, the term of this patent is extended or adjusted under 35 U.S.C. 154(b) by 90 days.

(21) Appl. No.: 13/748,333

(22) Filed: Jan. 23, 2013

(65) Prior Publication Data

US 2014/0207863 A1 Jul. 24, 2014

(51) Int. Cl.
H04L 29/08 (2006.01)
(52) U.S. Cl.
CPC .............. H04L 67/34 (2013.01); H04L 67/02 (2013.01)
(58) Field of Classification Search
CPC .................................. H04L 67/34; H04L 67/02
USPC ................................................. 709/203, 217
See application file for complete search history.

(56) References Cited

U.S. PATENT DOCUMENTS

| 7,490,141 | B1* | 2/2009 | Cammarata | H04L 63/08 709/219 |
| 2007/0208638 | A1* | 9/2007 | Brown | G06Q 40/02 705/35 |
| 2008/0194276 | A1* | 8/2008 | Lin et al. | 455/466 |
| 2008/0222628 | A1* | 9/2008 | Batra | G06F 8/60 717/171 |
| 2009/0013310 | A1* | 1/2009 | Arner | G06F 8/38 717/120 |
| 2010/0162274 | A1* | 6/2010 | Gangadharappa | G06F 9/445 719/328 |
| 2010/0306668 | A1* | 12/2010 | Williams, III | H04L 9/32 715/741 |
| 2010/0313199 | A1* | 12/2010 | Chen | G06F 9/5055 717/177 |
| 2011/0173294 | A1* | 7/2011 | Jackson | 709/217 |
| 2012/0158842 | A1* | 6/2012 | Brenner | H04L 67/02 709/204 |
| 2012/0191845 | A1* | 7/2012 | van de Burgt | H04L 43/0888 709/224 |
| 2012/0220263 | A1* | 8/2012 | Smith | H04W 4/003 455/410 |
| 2013/0086146 | A1* | 4/2013 | Addala et al. | 709/203 |
| 2014/0047016 | A1* | 2/2014 | Rao | H04L 67/22 709/203 |
| 2015/0067030 | A1* | 3/2015 | Smith | H04W 4/18 709/203 |

* cited by examiner

Primary Examiner — Brian J Gillis
Assistant Examiner — Javier O Guzman
(74) Attorney, Agent, or Firm — Fenwick & West LLP

(57) ABSTRACT

New functionality to be added to a web-based application and a desktop application is expressed as declarative and/or procedural code that a conventional rendering engine of the web-based application and the desktop application can use to directly update the state of the applications. Users need not update client-side components—such as the desktop application and/or any plug-ins used by the browser hosting the web-based application—to take advantage of new types of functionality.

18 Claims, 2 Drawing Sheets

COMMUNICATION BETWEEN A WEB-BASED APPLICATION AND A DESKTOP APPLICATION

BACKGROUND

The present invention generally relates to the field of web-based applications, and more specifically, to communication between a web-based application and a desktop application.

In some cases, the creators of a web-based application may also wish to provide users with a desktop application for viewing part or all of the information from the web-based application. For example, a particular organization might provide users with a web-based social networking application using their web application servers. Additionally, the company might provide users with a desktop application—i.e., an application written using an API of the underlying operating system that does not run within a web browser—that provides functionality specifically tailored to a specific aspect of the social networking application, such as chat. Given that a user may concurrently execute both the web-based application and the desktop application, it is desirable for changes in the state of the social networking application—such as substantive changes to the user interface layout—to be reflected in the desktop application, and vice-versa.

Using conventional communication techniques, however, any time that the provider of the web-based application wishes to add a new type of functionality, such as support for a new type of user interface change, the provider must update both the web-based application and the desktop application so that both can properly interpret the meaning of, and implement, the new functionality. For example, if the provider wishes to allow the web-based application to send a message to the desktop application that instructs the desktop application to make a particular user interface change, the web-based application must be updated to send the message and the desktop application must be updated to accept, interpret, and implement the message. Such updates may be inconvenient for a user who uses the social networking application, leading the user not to update the applications, with the result that the applications become outdated, not supporting the new functionality.

SUMMARY

Embodiments of the invention express new functionality to be added to a web-based application and a desktop application as declarative and/or procedural code that a conventional rendering engine of the web-based application and the desktop application can use to directly update the state of the applications. Thus, the web-based application need not have knowledge of some extrinsic meaning of an update message sent between the web-based application and the desktop application; rather, the meaning of the communication is implicit in the code itself. Accordingly, users need not update client-side components—such as the desktop application and/or any plug-ins used by the browser hosting the web-based application—to take advantage of the new functionality.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
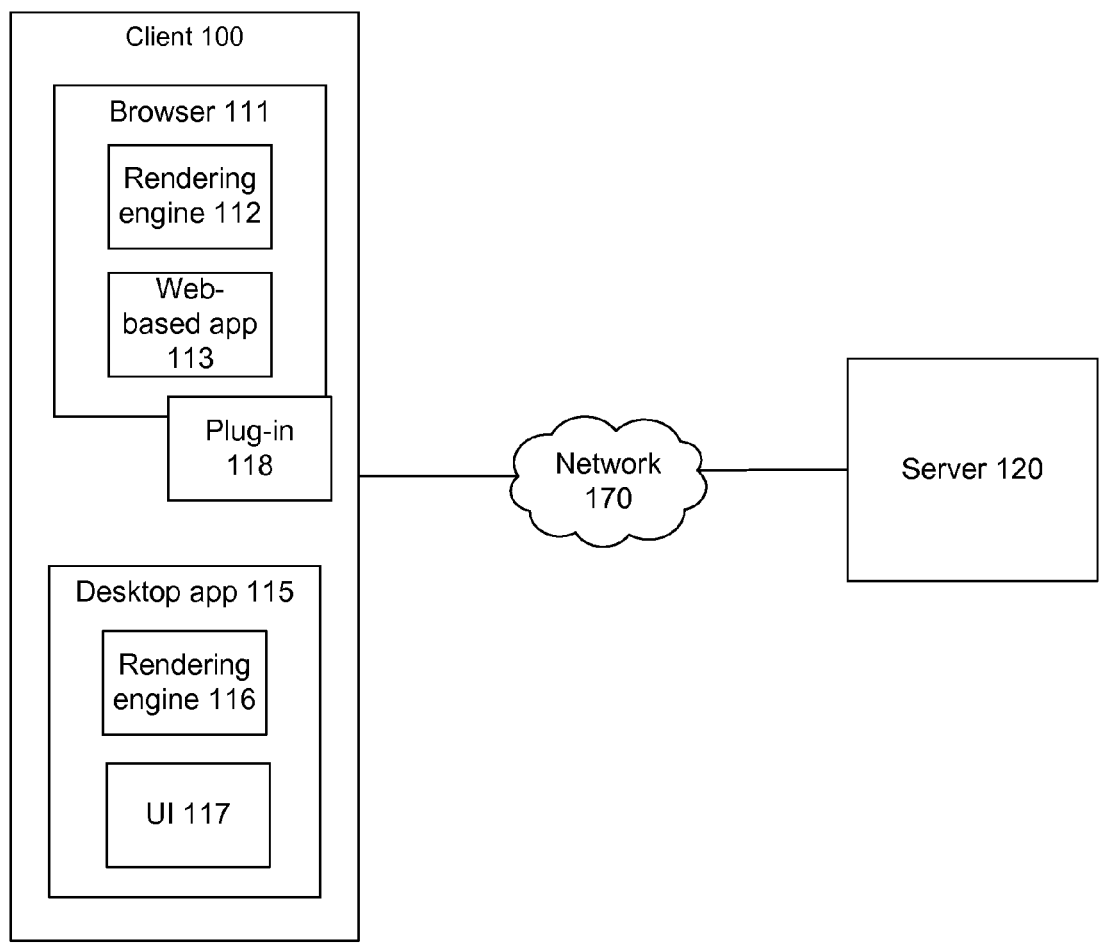
FIG. 1 is a high-level block diagram of a computing environment, according to one embodiment.

FIG. 1 is a high-level block diagram of a computing environment according to one embodiment. FIG. 1 illustrates a server 120 and a client device 100 connected by a network 170. A user uses the client device 100 to interact with the server 120, the server 120 providing a web-based application 113 that executes within a browser 111 of the client. The client device 100, or another separate device, additionally executes a desktop application 115 that is kept in sync with the web-based application 113. These components are now described in more detail.

The client device 100 is a computing device that executes client software, e.g., a browser 111 or other application, for performing actions such as interacting with social networking services or other applications provided by the server 120. The client device 100 might be, for example, a desktop computer; an ultrabook or other laptop computer; a smart phone or tablet computer using the IOS, ANDROID, or WINDOWS PHONE operating systems; or a personal digital assistant, for example.

The client device 100 has a browser 111 that hosts a web-based application 113 provided by the server 120.

The browser 111 comprises a rendering engine 112 that interprets or otherwise processes declarative and/or procedural code (e.g., HTML and JavaScript) that make up the web-based application 113, generating a user interface that the user can use to interact with the web-based application, as well as reacting to events triggered by the user, the server 120, or others. For example, the user interface may be generated by a rendering engine 112 such as WEBKIT based on HTML code provided by the server 120 in response to a user using the browser 111 to visit a URL associated the web-based application 113.

In some embodiments in which the browser 111 and a desktop application 115 both execute on the same client 100, interactions between the browser and the desktop application are carried out using a plug-in 118 of the browser 111. The plug-in 118 is software that conforms to a plug-in API of the browser 111 that permits it to interact with the browser, and may be written using any of a variety of different programming languages or technologies. The plug-in 118 is provided by the same organization that provides the web-based application 113 via the server 120 and that provides the desktop application 115. Unlike the web-based application 113, the plug-in 118 does not run within the browser 111, but rather is effectively part of the browser, and hence the plug-in is not subject to the same security restrictions that the browser imposes on the web-based application. Thus, the plug-in 118 is well-suited to handle the interprocess communications that may be used by the web-based application 113 to communicate with the desktop application 115.

Additionally, the plug-in 118 can provide the web-based application 113 with information about the status of the desktop application 115, such as whether the desktop application is running, or what user is logged in to the desktop application. The web-based application 113 can use such status information to customize its own appearance or actions. For example, the web-based application 113 can enable or disable user interface elements that refer to the desktop application based on whether the desktop application 115 is running (e.g., graying out or otherwise disabling certain user interface elements if the desktop application is not running). As another example, the web-based application 113 can show or hide certain communications based on whether the desktop application 115 is running and hence will handle the communications (e.g., suppressing popup windows for chat messages that will instead be handled by the running desktop application).

In one embodiment, the client device 100 further comprises the desktop application 115, which provides an alternative or complementary view of the same underlying data displayed by the web-based application 113. For example, in one embodiment both the web-based application 113 and the desktop application 115 display information associated with a user's account on a social networking system, such as FACEBOOK. For instance, the web-based application 113 might display a typical website-oriented view of the social networking system functionality as a whole, while the desktop application 115 might provide an alternate view, such as a view of the user's current chat sessions only.

The desktop application 115 is a standalone application not hosted by the browser 111. For example, the desktop application 115 may be written using a user interface API provided by the underlying operating system, such as the user interface API for MICROSOFT WINDOWS. In one embodiment, some or all of the user interface 117 is generated using a rendering engine 116 that takes as input the same type of declarative and/or procedural code (e.g., HTML and JavaScript) as the rendering engine 112 used to produce the user interface 114 for the web-based application 113. In some embodiments, the desktop application 115 defines a number of interfaces for use by the procedural code that it loads. For example, the desktop application 115 may define a window management interface that JavaScript loaded by the desktop application can use to manipulate the various windows of the desktop application, such as docking them.

In one embodiment, the desktop application 115 loads the declarative and/or procedural code only from some set of fixed URLs (e.g., defining default user interfaces), rather than allowing navigation to arbitrary URLs.

In other embodiments, the desktop application 115 need not execute on the client device 100, but rather may additionally and/or alternatively execute on another device accessible over the network 170. For example, the desktop application 115 might execute on a particular user's home computer, while the web-based application 113 might execute on the user's work computer (client device 100).

The server 120 provides at least the web-based application 113 to the client(s) 100 and, in some embodiments, may help to keep the web-based application 113 and the desktop application 115 in sync.

Different events may take place that necessitate keeping the desktop application 115 in sync with the web-based application 113. For example, when an event occurs within the web-based application 113, the web-based application (e.g., using its plug-in 118) will send state data corresponding to a state that reflects the event to the desktop application 115. The desktop application 115 will then apply its rendering engine 116 to the received state data to update the user interface 117.

As one example of an event necessitating keeping the desktop application 115 in sync with the web-based application, the user using the web-based application 113 may perform a user interface action that significantly changes the user interface of the web-based application 113, and this change may need to be reflected in the user interface 117 of the desktop application 115. For example, the web-based application 113 might include a particular tab or other user interface region that the user can move to user interface 117 of the desktop application 115. For instance, the web-based application 113 might include a chat message tab for displaying and specifying the user's chat sessions within the web-based application, and the user might specify via a user interface of the web-based application that the chat message tab should instead be displayed within a desktop application 115 oriented to chat. Accordingly, logic within the web-based application (e.g., JavaScript code) will remove the chat message tab from the user interface of the web-based application 113 and will communicate to the desktop application 115 state data causing the chat message tab to be displayed within its user interface, e.g., HTML representing the chat message tab's appearance and location. The rendering engine 116 of the desktop application 115 will accordingly render that state data, thereby supplementing the existing user interface 117 with the chat message tab.

Similarly, the web-based application 113 and the desktop application 115 might need to be kept in sync following an action performed by some other user that provides additional data that may be displayed within the web-based application 113. For instance, referring to the earlier example, another user may send a chat message that should appear in the chat message tab displayed within the desktop application 115. The data corresponding to this chat message would arrive at the server 120, after which the browser 111 would obtain it (e.g., in response to polling the server 120 for new information to refresh the current page, or in response to the server affirmatively pushing the information to the client 100). Logic in the web-based application 113 would then provide the corresponding update to the desktop application (e.g., using the plug-in 118). The web-based application 113 may provide the desktop application 115 with just the new data (e.g., the new chat message), or with a larger portion of the user interface state (e.g., all the HTML and JavaScript used to render the chat message tab and its messages, or to render the entire user interface of the web-based application).

In one embodiment, the browser 111 performs a security check to determine the source of the web-based application 113 before it passes a state change from the web-based application to the desktop application 115. For example, when the server 120 provides information about newly-received chat messages to the web-based application 113, the web-based application 113 may delegate the state change information corresponding to the newly-received chat messages to the plug-in 118 for conveyance to the desktop application 115. In this case, the plug-in 118 may check the source from which the information was received, such as the source IP address or the domain name of the source URL from which the web-based application 113 was loaded, and verify that it corresponds to the proper server 120. For example, the plug-in may require that the URL of the web-based application be from a particular domain, or one or more particular sub-domains of that domain. This prevents a malicious server injecting unwanted content into the desktop application 115, such as a rogue web-based application 113 attempting to inject spurious chat messages into a desktop application oriented towards chat, for example.

Note that using these techniques, a new type of user interface action (e.g., moving the chat message tab between applications 113, 115) or other action can be added without the client 100 needing to be updated. That is, because the web-based application 113 and the state data that constitutes the user interface 117 of the desktop application 115 are both provided by the server 120 and are made up of code (e.g., HTML and JavaScript) that can be interpreted by the rendering engines 112, 116 without any knowledge extrinsic to the code itself, the server can introduce new functionality simply by sending new web-based applications to the client(s) 100, and the existing rendering engines of the client(s) can implement it.

It is appreciated that although the web-based application 113 has been described as notifying the desktop application 115 of changes, the process could work in the other direction, as well, with the desktop application notifying the web-based application of changes via corresponding state data, which the rendering engine 112 of the browser 112 would then render to update the user interface of the web-based application.

Process for Inter-Application Communication

Figure 2:
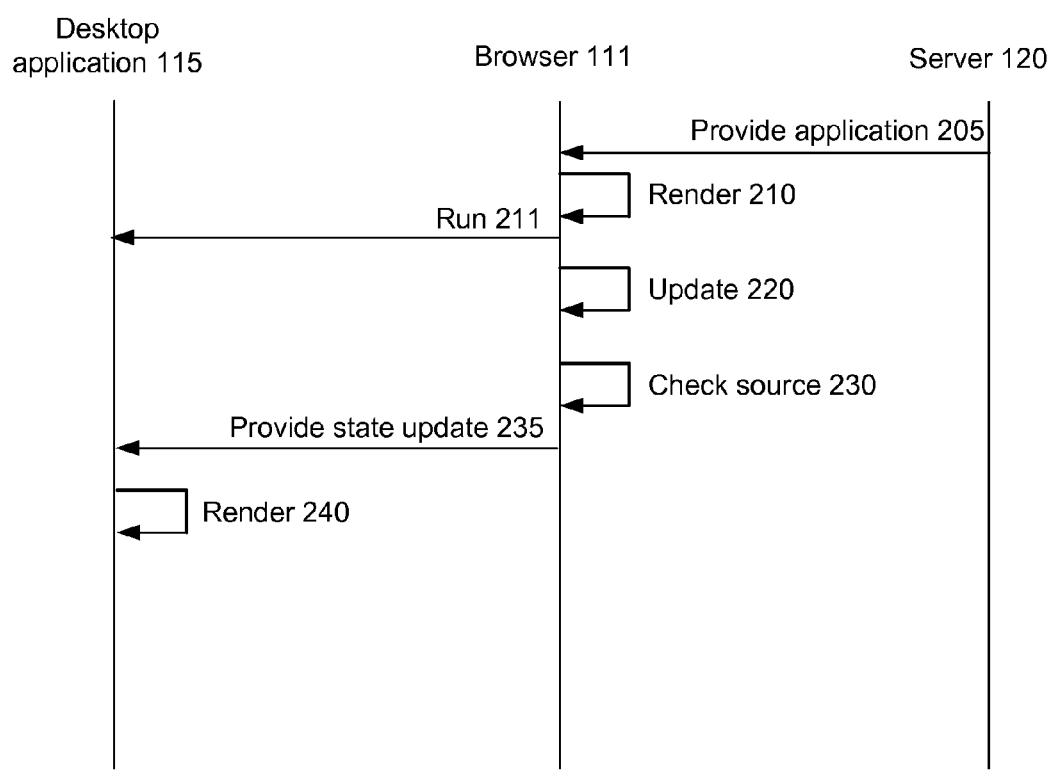
FIG. 2 illustrates interactions of a browser, a desktop application, and a server when synchronizing the desktop application with a web-based application running in the browser, according to one embodiment.

FIG. 2 illustrates interactions of a browser 111, a desktop application 115, and a server 120 when keeping the desktop application in sync with a web-based application 113 running in the browser, according to one embodiment.

Initially, the server 120 provides 205 the web-based application 113 to the client 100. That is, the server 120 provides 205 the declarative and/or procedural code (e.g., HTML and JavaScript) that, when interpreted by the browser 111, constitutes the web-based application 113. Accordingly, the browser 111 receives the code, interprets it, and renders 210 the web-based application 113 as a result of the interpretation. For example, the browser's rendering engine 112 may lay out the user interface of the web-based application 113 based on received HTML code, and may respond to events in that user interface, or take other more complex actions, based upon received JavaScript code.

The browser 111 may then run 211 the desktop application 115 if it is not running already. In one embodiment, for example, the web-based application 113 includes procedural code that causes the desktop application 115 to begin execution (e.g., JavaScript calls to the plug-in 118, which in turn runs the desktop application). The browser 111 may cause the desktop application 115 to run in response to the web-based application 113 itself beginning to run, or in response to some asynchronous event occurring within the web-based application, such as the user taking an action that requires the desktop application. In some embodiments, the desktop application may automatically be run at system startup or user login, or the user may manually run the application.

At some point an event occurs within the web-based application 113 that causes a change that requires the desktop application 115 to be synchronized with the web-based application. As noted above, examples of such events include the user making a particular substantive change to the user interface that should be reflected in the desktop application 115 (e.g., requesting that a given panel of the user interface be displayed in the desktop application), or a new message arriving and being displayed within the web-based application 113.

In response, the web-based application 113 additionally updates 220 itself as needed based on the event, such as updating the user interface of the web-based application in accordance with the event.

The browser 111 may optionally check that the source of any information provided by a server (e.g., a new chat message) came from the expected server 120, as described above. For example, the plug-in 118 of the browser 111 may verify the IP address or source domain name, refraining from providing a state update to the desktop application 115 if verification fails.

To keep the desktop application 113 in sync with the web-based application 113, the web-based application provides 235—e.g., via the plug-in 118—an update to the state of the desktop application 115. As described earlier, the state update is in the form of declarative and/or procedural code that is interpretable by the standard rendering engine 116 of the desktop application, as opposed to particular commands or codes with a meaning specific to the web-based application 113 and/or the desktop application 115. For example, in one embodiment the state update includes the HTML and JavaScript code that define the user interface 117.

The desktop application 115 renders the state update, incorporating it into the user interface 117. For example, HTML/JavaScript code of the state update could supplement or replace HTML/JavaScript code defining the state of the desktop application 115 prior to receipt of the state update.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, from a remote application server by a browser on a client device, code for a web-based application;
   running, by the browser, the web-based application using the received code;
   identifying, by the web-based application, a change to a state of the web-based application, the change to the state of the web-based application comprising a transfer of a message from a message display area of the web-based application to a message display area of desktop application run on an operating system of the client device, the transfer comprising removal of the message from the message display area of the web-based application and addition of the message to the message display area of the desktop application, the desktop application being run concurrently with the web-based application by a user of the client device and not hosted by the browser;
   generating, by the web-based application, state data code reflecting the change;
   communicating, by the web-based application to the desktop application, the state data code; and
   implementing, by the desktop application, the change to the state of the web-based application by rendering the state data code to display the message.

2. The computer-implemented method of claim 1, wherein the change to the state of the web-based application is initiated by an interaction of the user with the user interface of the web-based application.

3. The computer-implemented method of claim 1, wherein the browser communicates the state code data code to the desktop application using a browser plug-in.

4. The computer-implemented method of claim 1, wherein:
   the change to the state of the web-based application is received from a remote server; and
   the web-based application communicates the state data code to the desktop application only in response to the browser verifying that the remote server is the remote application server.

5. A non-transitory computer-readable storage medium comprising:
   instructions for receiving, from a remote application server by a browser on a client device, code for a web-based application;
   instructions for running, by the browser, the web-based application using the received code;
   instructions for identifying, by the web-based application, a change to a state of the web-based application, a change to a state of the web-based application, the change to the state of the web-based application comprising a transfer of a message from a message display area of the web-based application to a message display area of a desktop application run on an operating system of the client device, the transfer comprising removal of the message from the message display area of the web-based application and addition of the message to the message display area of the desktop application, the desktop application being run concurrently with the web-based application by a user of the client device and not hosted by the browser;
   instructions for generating, by the web-based application, state data code reflecting the change;
   instructions for communicating, by the web-based application to the desktop application, the state data code; and
   instructions for implementing, by the desktop application, the change to the state of the web-based application by rendering the state data code.

6. The non-transitory computer-readable storage medium of claim 5, wherein the change to the state of the web-based application is initiated by an interaction of the user with the user interface of the web-based application.

7. The non-transitory computer-readable storage medium of claim 5, wherein the browser communicates the state code data code to the desktop application using a browser plug-in.

8. The non-transitory computer-readable storage medium of claim 5, wherein:
   the change to the state of the web-based application is received from a remote server; and
   the web-based application communicates the state data code to the desktop application only in response to the browser verifying that the remote server is the remote application server.

9. A computer system comprising:
   a processor; and
   a computer program executable by the computer processor, the computer program comprising:
      instructions for receiving, from a remote application server by a browser on a client device, code for a web-based application;
      instructions for running, by the browser, the web-based application using the received code;
      instructions for identifying, by the web-based application, a change to a state of the web-based application, a change to a state of the web-based application, the change to the state of the web-based application comprising a transfer of a message from a message display area of the web-based application to a message display area of a desktop application run on an operating system of the client device, the transfer comprising removal of the message from the message display area of the web-based application and addition of the message to the message display area of the desktop application, the desktop application being run concurrently with the web-based application by a user of the client device and not hosted by the browser;
      instructions for generating, by the web-based application, state data code reflecting the change;
      instructions for communicating, by the web-based application to the desktop application, the state data code; and instructions for implementing, by the desktop application, the change to the state of the web-based application by rendering the state data code.

10. The computer system of claim 9, wherein the change to the state of the web-based application is initiated by an interaction of the user with the user interface of the web-based application.

11. The computer system of claim 9, wherein the browser communicates the state code data code to the desktop application using a browser plug-in.

12. The computer system of claim 9, wherein:
the change to the state of the web-based application is received from a remote server; and
the web-based application communicates the state data code to the desktop application only in response to the browser verifying that the remote server is the remote application server.

13. The method of claim 1, wherein the web-based application causes the desktop application to run.

14. The method of claim 1, wherein implementing the change to the state of the web-based application comprises visually rendering the state data code.

15. The non-transitory computer-readable storage medium of claim 5, wherein the web-based application causes the desktop application to run.

16. The non-transitory computer-readable storage medium of claim 5, wherein implementing the change to the state of the web-based application comprises visually rendering the state data code.

17. The computer system of claim 9, wherein the web-based application causes the desktop application to run.

18. The computer system of claim 9, wherein implementing the change to the state of the web-based application comprises visually rendering the state data code.

* * * * *

UNITED STATES PATENT AND TRADEMARK OFFICE
CERTIFICATE OF CORRECTION

PATENT NO. : 9,692,854 B2  
APPLICATION NO. : 13/748333  
DATED : June 27, 2017  
INVENTOR(S) : Arieh Steinberg et al.

Page 1 of 1

It is certified that error appears in the above-identified patent and that said Letters Patent is hereby corrected as shown below:

In the Claims

Column 7, Line 30, after "display area of" insert -- a --.
Column 7, Line 51, after "state" delete "code".
Column 8, Line 2, after "web-based application," delete "a" and insert -- the --.
Column 8, Line 3, after "change to" insert -- the -- and delete "a".
Column 8, Line 29, after "state" delete "code".
Column 8, Line 41, after "the" delete "computer".
Column 8, Line 48, after "application," delete "a change to a state of the web-based application,".
Column 9, Line 9, after "state" delete "code".

Signed and Sealed this
Sixteenth Day of April, 2019

Andrei Iancu
*Director of the United States Patent and Trademark Office*